(12) United States Patent
Yebka et al.

(10) Patent No.: US 12,442,400 B2
(45) Date of Patent: Oct. 14, 2025

(54) SCREW RELEASE WITH FORCE RELEASE COMPONENT

(71) Applicant: Lenovo (Singapore) Pte. Ltd., New Tech Park (SG)

(72) Inventors: Bouziane Yebka, Apex, NC (US); Tin-Lup Wong, Chapel Hill, NC (US); Philip Jakes, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/232,197

(22) Filed: Aug. 9, 2023

(65) Prior Publication Data

US 2023/0383778 A1    Nov. 30, 2023

Related U.S. Application Data

(62) Division of application No. 16/951,755, filed on Nov. 18, 2020, now Pat. No. 11,761,467.

(51) Int. Cl.
| | |
|---|---|
| *F16B 31/02* | (2006.01) |
| *F16B 5/02* | (2006.01) |
| *F16B 31/00* | (2006.01) |

(52) U.S. Cl.
CPC .............. *F16B 5/02* (2013.01); *F16B 31/005* (2013.01); *F16B 31/028* (2013.01)

(58) Field of Classification Search
CPC ....... F16B 31/00; F16B 31/021; F16B 31/005
USPC .................................................. 411/390, 391
See application file for complete search history.

(56) References Cited

U.S. PATENT DOCUMENTS

| | | | |
|---|---|---|---|
| 3,120,149 A | 2/1964 | Dickie | |
| 3,204,515 A | 9/1965 | Dickie | |
| 3,258,887 A * | 7/1966 | Mostoller | E04B 1/98 |
| | | | 52/547 |
| 3,298,273 A * | 1/1967 | McKelvey | F16B 35/00 |
| | | | 411/1 |
| 3,405,593 A | 10/1968 | Kriesel | |
| 3,635,435 A | 1/1972 | Perison, Sr. | |
| 3,899,196 A | 8/1975 | Dashner | |
| 4,436,273 A | 3/1984 | Yuda et al. | |
| 4,832,547 A * | 5/1989 | Shiraishi | F16B 19/1081 |
| | | | 411/39 |
| 4,902,046 A | 2/1990 | Maloberti | |
| 5,199,834 A * | 4/1993 | Seidl | B60R 21/215 |
| | | | 296/35.3 |
| 5,927,747 A | 7/1999 | Farrington | |
| 7,862,282 B2 | 1/2011 | Smith et al. | |
| 8,277,965 B2 * | 10/2012 | Hermann | H01M 10/653 |
| | | | 429/185 |
| 8,850,765 B2 | 10/2014 | Amengual Pericas | |
| 9,669,932 B2 * | 6/2017 | Murata | B60R 11/0229 |

(Continued)

OTHER PUBLICATIONS

"Tork Bolts Offer Superior Theft Resistance.", Loss Prevention Fasteners & Tools.

*Primary Examiner* — Flemming Saether (74) *Attorney, Agent, or Firm* — Kunzler Bean & Adamson; Bruce R. Needham (57) ABSTRACT

A screw includes a screw head, a threaded shaft, and a force release component connecting the screw head to the threaded shaft. The force release component releases the screw head from the threaded shaft in response to a specified force. The specified force is substantially along a screw axis in-line with the threaded shaft.

15 Claims, 8 Drawing Sheets

(56) References Cited

U.S. PATENT DOCUMENTS

| | | | |
|---|---|---|---|
| 9,954,209 B2 * | 4/2018 | Chujo | H01M 50/3425 |
| 10,336,211 B2 * | 7/2019 | Kobayashi | B60K 1/04 |
| 10,598,206 B2 * | 3/2020 | Bier | F16B 31/021 |
| 10,767,682 B2 * | 9/2020 | Leon | F16B 41/002 |

* cited by examiner

SCREW RELEASE WITH FORCE RELEASE COMPONENT

CROSS-REFERENCE TO RELATED APPLICATIONS

This is a divisional application of and claims priority to U.S. patent application Ser. No. 16/951,755 entitled "SCREW RELEASE" and filed on Nov. 18, 2020 for Bouziane Yebka, et al., which is incorporated herein by reference.

FIELD

The subject matter disclosed herein relates to screw release and more particularly relates to screw release in response to a specified force.

BACKGROUND

Screws in bosses hold assemblies together.

BRIEF SUMMARY

An apparatus for screw release is disclosed. The apparatus includes a boss, a screw secured to the boss, and a force release component connected to one of the boss and the screw. The force release component releases a portion of the screw from the boss in response to a specified force. A system and method also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
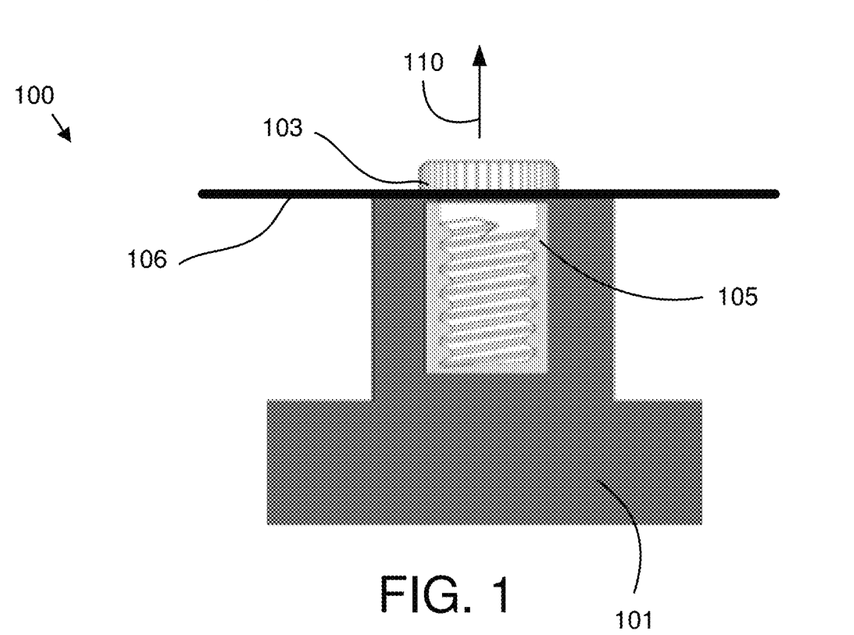
FIG. 1 is a side view drawing illustrating one embodiment of a boss and screw.

FIG. 1 is a side view drawing illustrating one embodiment of a boss 101 and a screw 103 in a connection system 100. The screw 103 is secured to the boss 101. The screw 103 may secure a component 106 to the boss 101. The boss 101 may be physically connected to an assembly, a frame, a chassis, and the like. In one embodiment, the boss 101 is physically connected to the chassis of a portable computer.

Although the screw 103 secures the component 106 to the boss 101, there are circumstances when it is advantageous for the screw 103 to allow the component 106 to separate from the boss 101. For example, the screw 103 may secure a panel component 106 to a boss 101 disposed on the chassis of a portable computer. Under some circumstances, a rechargeable battery for the portable computer may swell in size, exerting significant force between the panel component 106 and the boss 101. The swollen battery may crack the panel component 106 and/or the chassis connected to the boss 101, effectively destroying the portable computer.

The embodiments include a force release component 105 connected to one of the boss 101 and the screw 103. The force release component 105 releases a portion of the screw 103 from the boss 101 in response to a specified force 110 as will be described hereafter. As a result, the component 106 may separate from the boss 101 without damage to the component 106, the boss 101, and/or members connected to the component 106 and/or boss 101. As a result, damage caused by excessive forces between the boss 101 and the screw 103 is easily repaired, reducing service costs for products employing the screw 103 and the boss 101.

In one embodiment, the force release component 105 is connected to one of the boss 101 and the screw 103. In addition, the force release component 105 may be connected to both the boss 101 and the screw 103. In a certain embodiment, a first connection of the boss 101 to the force release component 105 and a second connection of the screw 103 to the force release component 105 may be fractured, severed, and/or broken with different amounts of force. For example, a higher force may be required to fracture, sever, and/or break the first connection than to break the second connection. The force release component 105 releases a portion of the screw 103 from the boss 101 in response to the specified force 110.

Figure 2A:
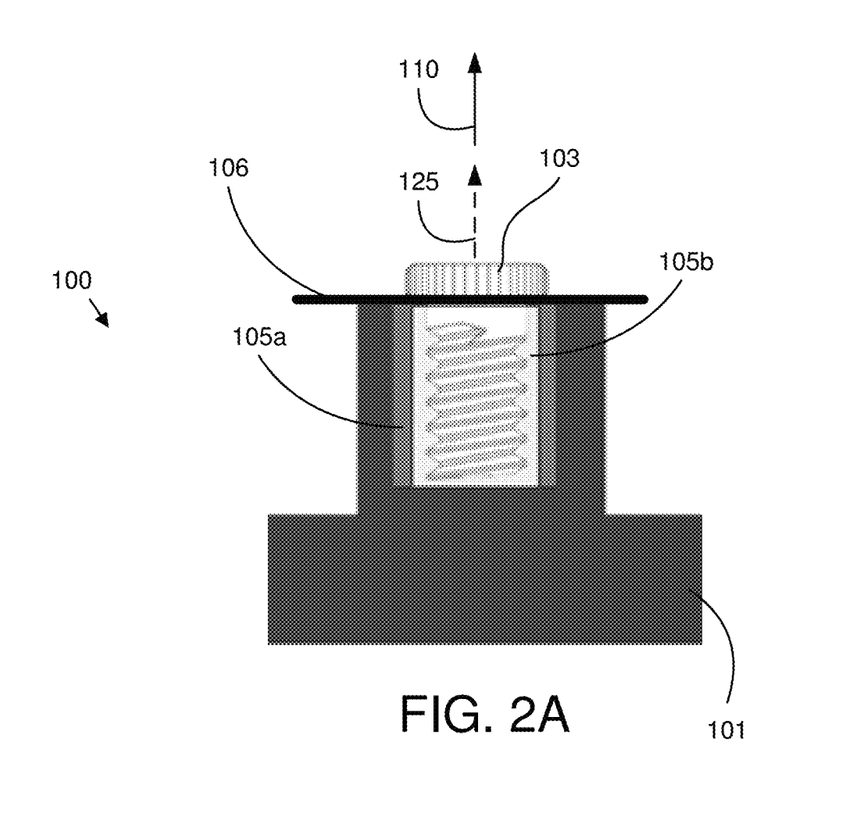
FIG. 2A is a side view drawing illustrating one embodiment of a boss, a screw, and a force release component.

FIG. 2A is a side view drawing illustrating one embodiment of a boss 101, a screw 103, and a force release component 105. In the depicted embodiment, the force release component 105 includes an inner force release component 105b and an outer force release component 105a. The inner force release component 105b may separate from the outer force release component 105a in response to the specified force 110. The outer force release component 105a may require a higher force than the specified force 110 to separate from the boss 101.

In response to the specified force 110, the inner force release component 105b separates from the outer force release component 105a. As used herein, the inner force release component 105b is separated from the outer force release component 105a if the inner force release component 105b is displaced relative to the outer force release component 105a. The inner force release component 105b may separate from the outer force release component 105a while still overlapping a portion of the outer force release component 105a.

As a result of the inner force release component 105b separating from the outer force release component 105a, the screw 103 is released from the boss 101, relieving the force between the boss 101 and the component 106. In one embodiment, the specified force 110 is substantially along a screw axis 125. As used herein, substantially is within 30 degrees of the screw axis 125. The screw axis 125 may be coaxial with the screw 103. In addition, the screw access 125 may be coaxial with the boss 101. In one embodiment, the specified force 110 is specified for a force component along the screw axis 125.

Figure 2B:
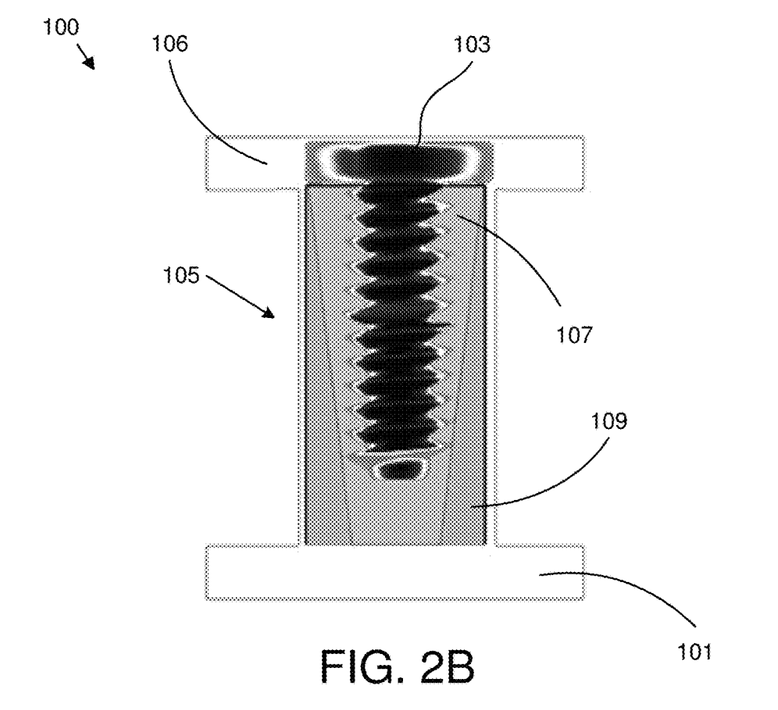
FIG. 2B is a side view drawing illustrating one embodiment of a release sleeve and an anchor.

FIG. 2B is a side view drawing illustrating one embodiment of a release sleeve 107 and an anchor 109 in a connection system 100. The release sleeve 107 and the anchor 109 may comprise the force release component 105. In one embodiment, the release sleeve 107 is the inner force release component 105b and the anchor 109 is the outer force release component 105a.

The boss 101 is secured to the anchor 109. The release sleeve 107 is fracturably secured to the anchor 109 of the boss 101. The release sleeve 107 may be bonded to the anchor 109 with a fracturable adhesive. In addition, the release sleeve 107 may be press fit into the anchor 109. The screw 103 is secured within the release sleeve 107. The release sleeve 107 separates from the anchor 109 in response to the specified force 110. For example, the specified force 110 may fracture the adhesive. In addition, the specified force 110 may break the press fit.

Figure 2C:
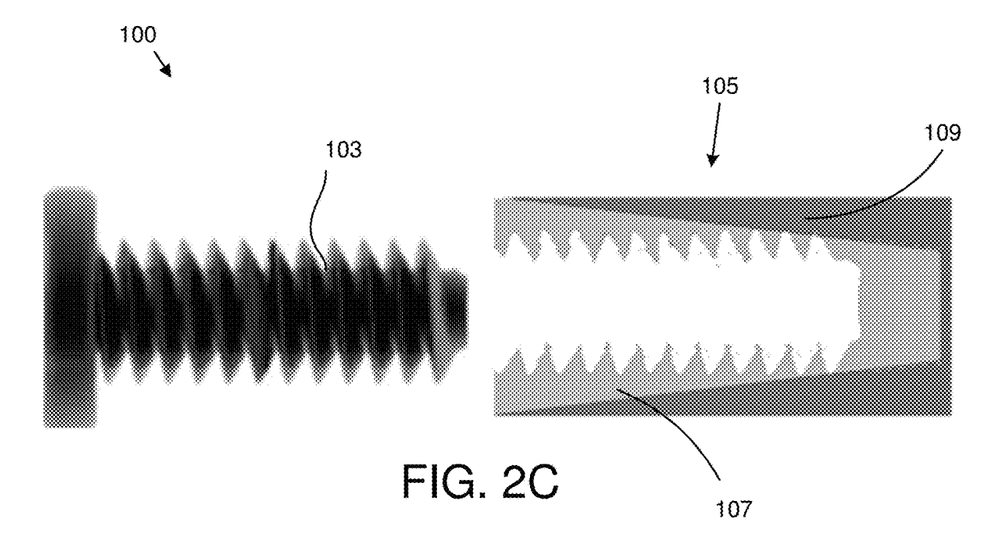
FIG. 2C is a side view drawing illustrating one alternate embodiment of a release sleeve and an anchor.

FIG. 2C is a side view drawing illustrating one alternate embodiment of the release sleeve 107 and the anchor 109. In the depicted embodiment, the release sleeve 107 and the anchor 109 are separated from the boss 101. The release sleeve 107 and the anchor 109 may be inserted into the boss 101 to allow the boss 101 to receive the screw 103. Because the anchor 109 and/or anchor 109 and release sleeve 107 may be separated from the boss 101, a new anchor 109 and/or release sleeve 107 may be connected to the boss 101 after the release sleeve 107 and/or force release component 105 separates from the anchor 109 and/or boss 101, supporting easy repairs after a separation of the release sleeve 107 and/or force release component 105.

Figure 2D:
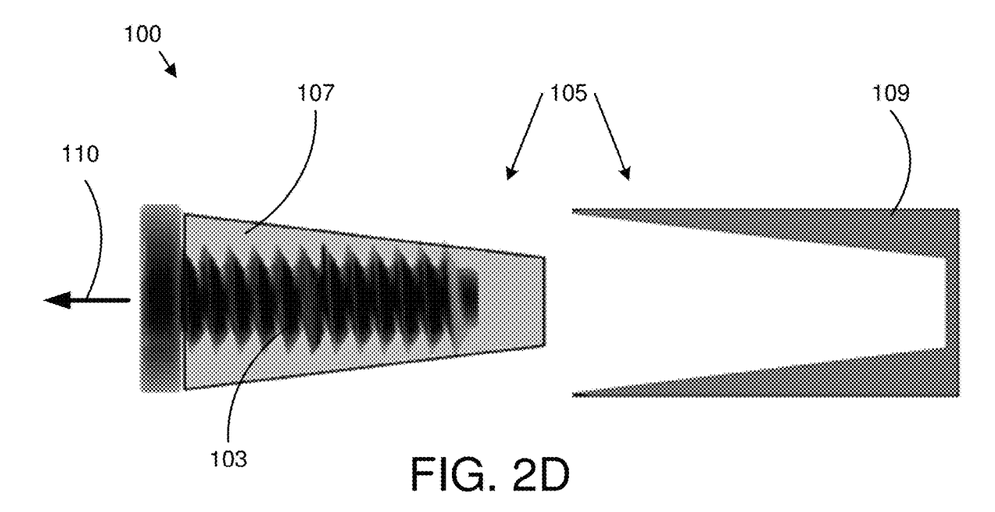
FIG. 2D is a side view drawing illustrating one embodiment of a separated release sleeve and anchor.

FIG. 2D is a side view drawing illustrating one embodiment of a separated release sleeve 107 and anchor 109. In the depicted embodiment, the release sleeve 107 is separated from the anchor 109 in response to the specified force 110. In one embodiment, the release sleeve 107 may be re-adhered to the anchor 109 with an adhesive. In addition, the release sleeve 107 may be re-press fit to the anchor 109. As a result, the screw 103 and boss 101 may be easily repaired after a separation.

Figure 2E:
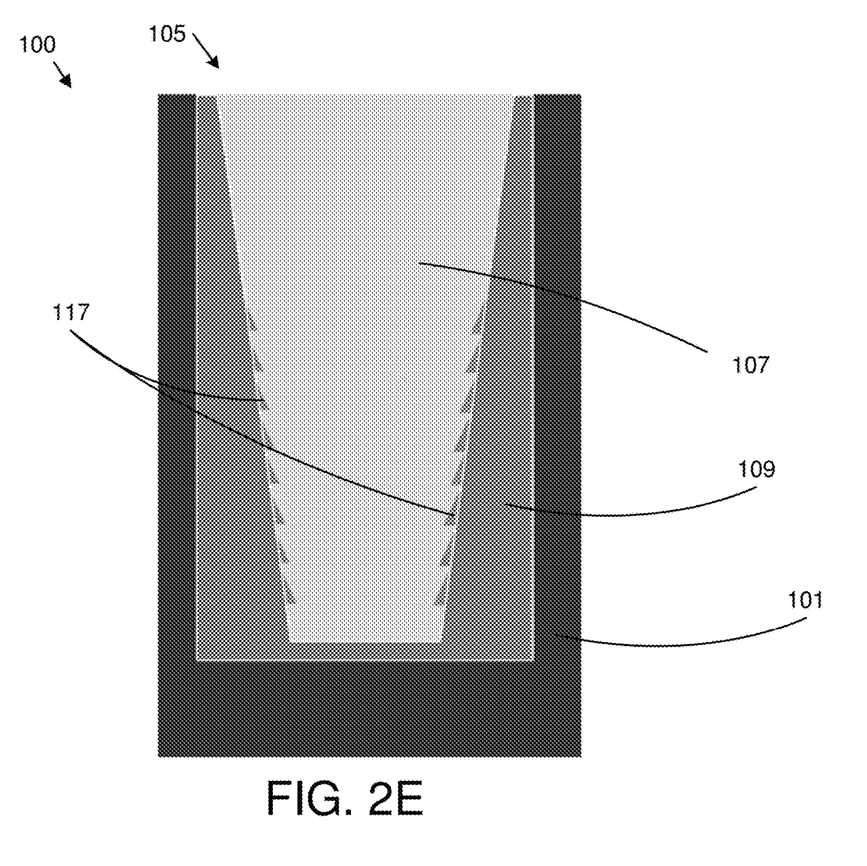
FIG. 2E is a side view drawing illustrating one embodiment of a sleeve grooves.

FIG. 2E is a side view drawing illustrating one embodiment of a sleeve groove 117. One or more sleeve grooves 117 may be formed in the release sleeve 107. The sleeve grooves 117 may modify the specified force 110 needed to release a portion of the screw 103 from the boss 101. In one embodiment, the sleeve grooves 117 reduce the specified force 110. In an alternative embodiment, the sleeve grooves 117 increase the specified force 110. As a result, the specified force 110 may be modified.

Figure 3A:
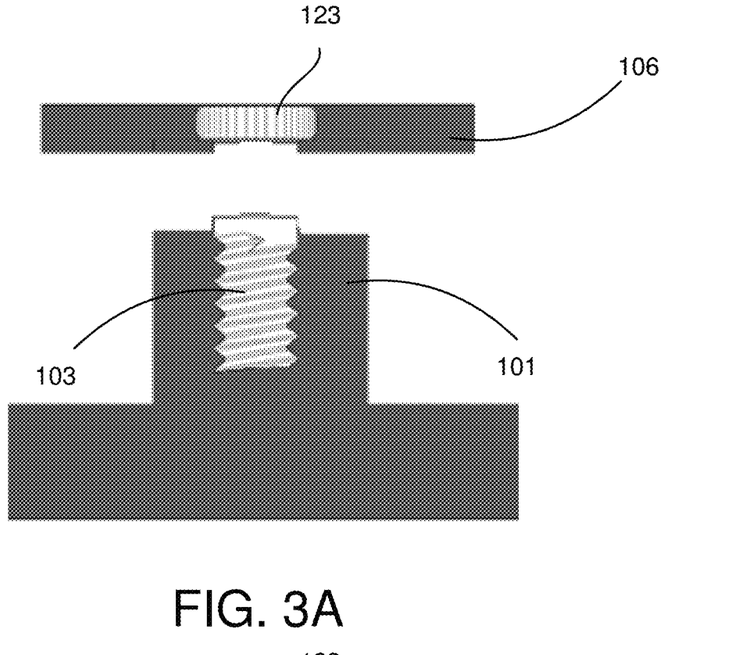
FIG. 3A is a side view drawing illustrating one embodiment of a separating screw head.

FIG. 3A is a side view drawing illustrating one embodiment of a separating screw head 123. In the depicted embodiment, the force release component 105 is a screw head 123 that separates from the screw 103 in response to the specified force 110. For example, the screw head 123 may be fracturably connected to the screw 103. The screw head 123 may be bonded to the screw 103 with an adhesive. In addition, slits in the screw 103 may weaken the connection between the screw 103 and the screw head 123.

In response to the specified force 110, the screw head 123 separates from the screw 103. As a result, the component 106 is not physically connected to the boss 101.

Figure 3B:
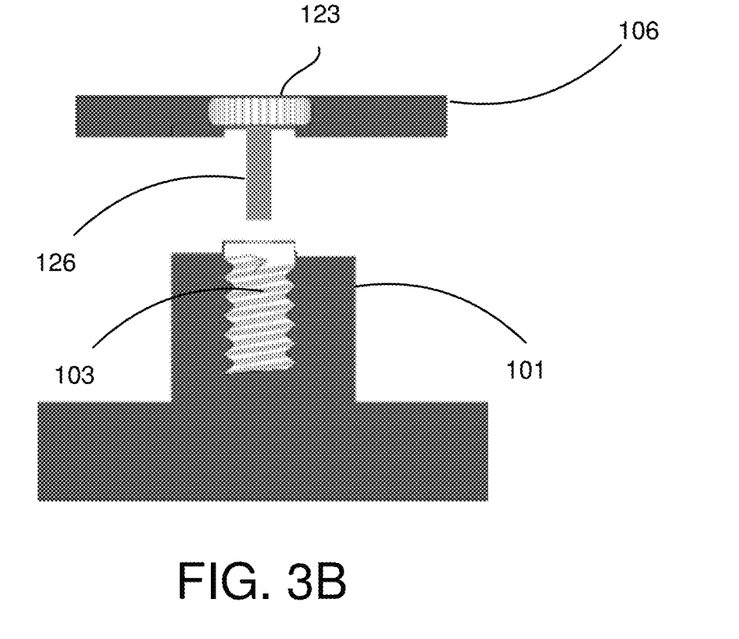
FIG. 3B is a side view drawing illustrating one alternate embodiment of a separating screw head.

FIG. 3B is a side view drawing illustrating one embodiment of a separated screw head 123. In the depicted embodiment, the screw head 123 includes a screw plunger 126. The screw plunger 126 may be coaxial with the screw 103. In one embodiment, the screw plunger 126 is bonded to the screw 103 with an adhesive. In addition, the screw plunger 126 may be press fit to the screw 103. The screw head 123 and the screw plunger 126 separate from the screw 103 in response to the specified force 110.

Figure 4A:
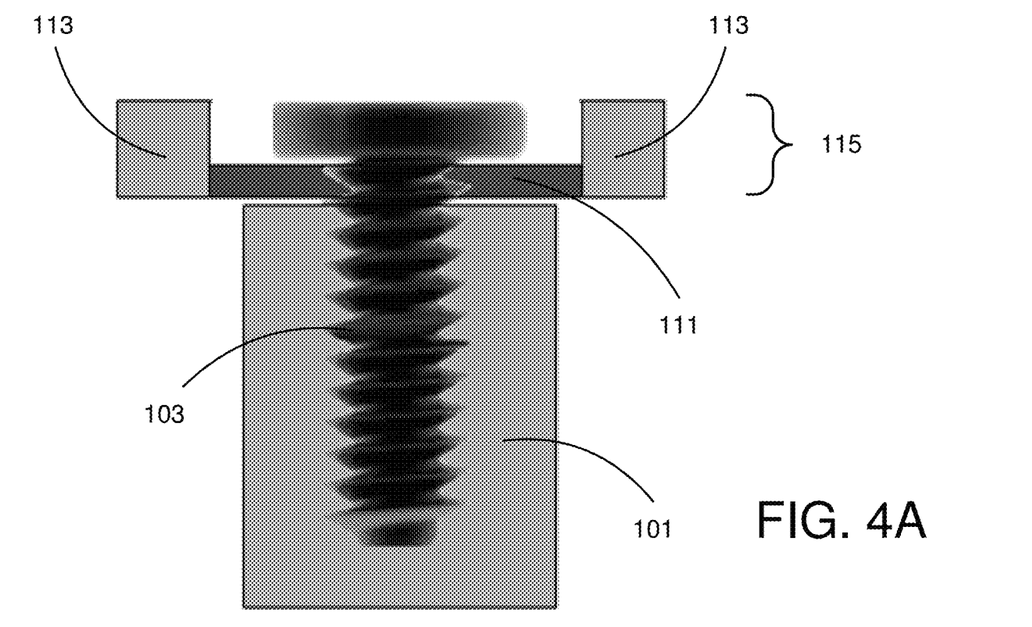
FIG. 4A is a side view drawing illustrating one embodiment of a release washer.

FIG. 4A is a side view drawing illustrating one embodiment of a release washer 115. In the depicted embodiment, the force release component 105 is embodied in the release washer 115. A portion of the release washer 115 may separate from the screw 103 in response to the specified force 110.

The release washer 115 may include a base portion 111 and a detachable portion 113. The detachable portion 113 may be bonded to the base portion 111 with an adhesive. In addition, the detachable portion 113 may be press fit to the base portion 111.

Figure 4B:
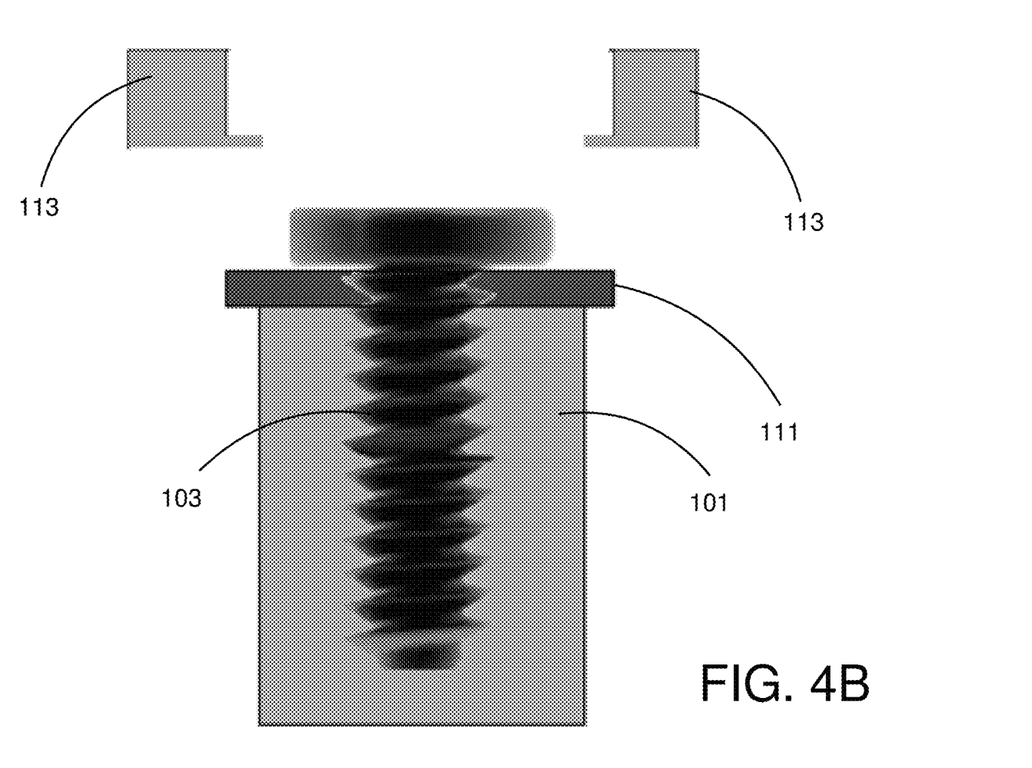
FIG. 4B is a side view drawing illustrating one embodiment of a separated release washer.

FIG. 4B is a side view drawing illustrating one embodiment of a separated release washer 115. In the depicted embodiment, the detachable portion 113 is separated from the base portion 111 in response to the specified force 110. As a result, the detachable portion 113 separates from the screw 103.

Figure 5:
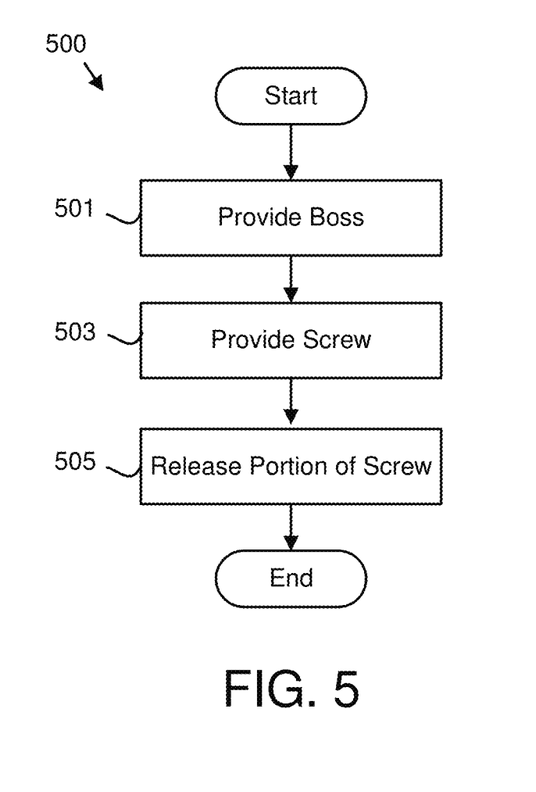
FIG. 5 is a schematic flow chart diagram illustrating one embodiment of a force release method.

FIG. 5 is a schematic flow chart diagram illustrating one embodiment of a force release method 500. The method 500 may release a portion of the screw 103 from the boss 101 in response to the specified force 110.

The methods 500 starts, and in one embodiment, the method 500 provides 501 the boss 101. In addition, the method 500 may provide 503 the screw 103 secured to the boss 101. In response to the specified force 110, the force release component 105 releases 505 a portion of the screw 103 from the boss 101. The force release component 105 may comprise the release sleeve 107 secured to the anchor 109. In addition, the force release component 105 may comprise the screw head 123 that separates from the screw 103. In a certain embodiment, the screw head 123 includes the screw plunger 126. The force release component 105 may comprise the release washer 115.

Figure 6A:
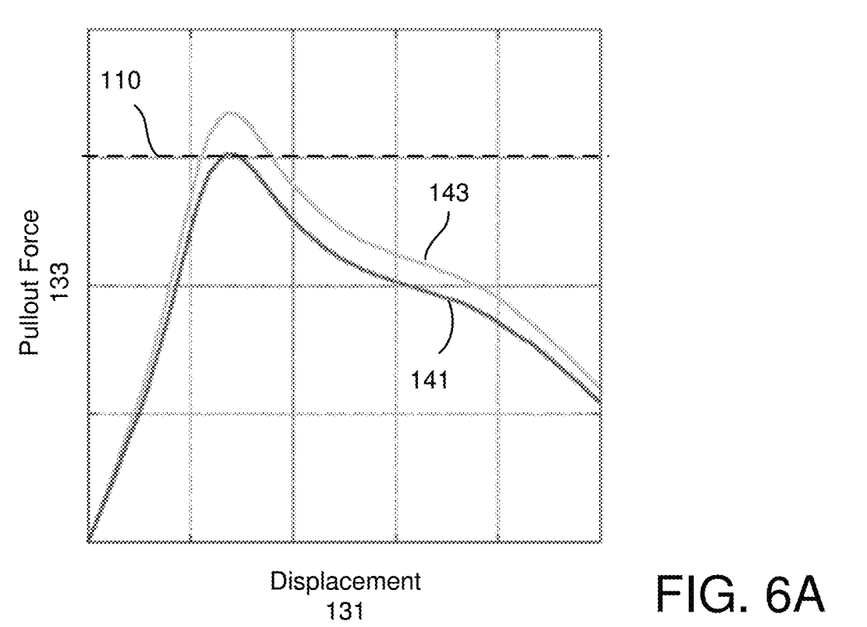
FIG. 6A is a graph illustrating one embodiment of release forces for a force release component.

FIG. 6A is a graph illustrating one embodiment of release forces for a force release component 105. Line 141 shows the displacement 131 of the release sleeve 107 relative to a pullout force 133. Line 143 shows the displacement 131 of the anchor 109 relative to the pullout force 133. In the depicted embodiment, there is minimal displacement 131 of the release sleeve 107 until the pullout force 133 is equal to the specified force 110. The displacement of the release sleeve 107 reduces the pullout force 133. However, the anchor 109 may be removed from the boss 101 with sufficient pullout force 133 to support repairs to the boss 101 and screw 103.

Figure 6B:
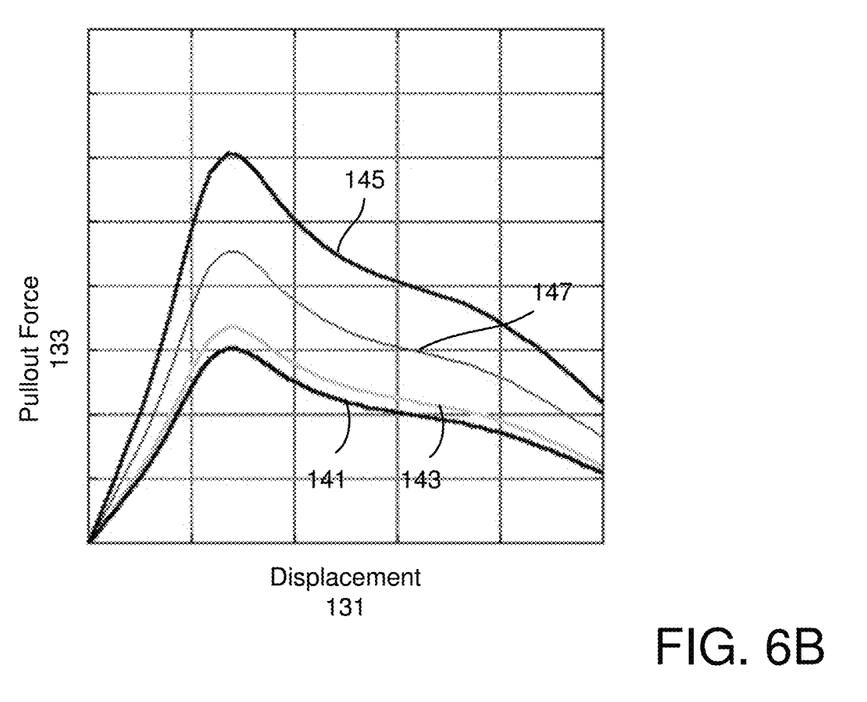
FIG. 6B is a graph illustrating one embodiment of release forces for a force release component.

FIG. 6B is a graph illustrating one embodiment of release forces for a force release component 105. Lines 145 and 147 show the displacement 131 of anchor 109 with different bonding to the boss 101. Different bonding may modify the difference between the pullout force 133 required to displace the anchor 109 and the release sleeve 107.

The force release component 105 connected to one or more of the boss 101 and screw 103 releases a portion of the screw 103 in response to the specified force 110. As a result, damage from excessive forces between the boss 101 and the screw 103 are mitigated.

Figure 7:
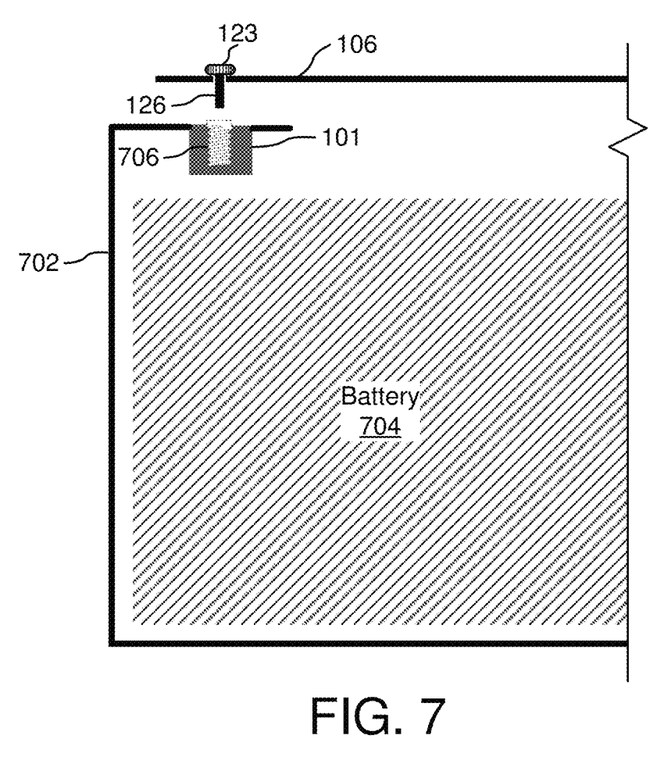
FIG. 7 is a graph illustrating one embodiment of a chassis of an electronic device with a battery and a cover where the chassis includes a boss with a threaded shaft and where the panel includes an opening where a screw head and screw plunger extend through the opening.

FIG. 7 is a graph illustrating one embodiment of a chassis 702 of an electronic device with a battery 704 and a panel 106 where the chassis 702 includes a boss 101 with a threaded shaft 706 and where the panel 106 includes an opening where a screw head 123 and screw plunger 126 extend through the opening. Expansion of the battery 704 exerts a force on the panel 106 and/or the chassis 702. The specified force due to the force the battery 704 exerts on the panel 106 and/or the chassis 702 is below a damage point of the panel 106 and/or the chassis 702. Prior to expansion of the battery 704, the panel 106, screw 103, and boss 101 are as depicted in FIG. 2A with the screw plunger 126 in the threaded shaft 706. After the specified force, the screw plunger 126 separates from the threaded shaft 706, as depicted in FIG. 7.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A screw comprising:
    a screw head;
    a threaded shaft; and
    a force release component comprising a screw plunger connected to the screw head that is coaxial with the threaded shaft and inserted into an opening in the threaded shaft and connecting the screw head to the threaded shaft to the screw, wherein the screw plunger is bonded to the threaded shaft with an adhesive, and wherein the plunger extends into the opening shaft a distance less than a length of the threaded shaft, and wherein the screw plunger releases from the threaded shaft in response to a specified force on the screw head, the specified force is substantially along a screw axis in-line with the threaded shaft.

2. The screw of claim 1, wherein the screw plunger is press fit into the threaded shaft.

3. The screw of claim 1, wherein the threaded shaft is secured to a boss and wherein a bond strength between the screw head and the threaded shaft is less than a bond strength between the threaded shaft and the boss.

4. The screw of claim 1, the screw head comprises a diameter larger than the threaded shaft, and wherein the threaded shaft is configured to be inserted through an opening in a second component such that the screw head engages to the second component to secure the second component to a first component and wherein a force in a direction to separate the second component from the first component upon reaching the specified force releases the screw head and screw plunger from the first component.

5. The screw of claim 1, wherein the specified force is higher than a force used to secure the screw to a component.

6. The screw of claim 1, wherein the threaded shaft is configured to be secured to a boss and the screw head is configured to secure a component to the boss.

7. The screw of claim 1, wherein the threaded shaft is configured to be secured to a first component and the screw head is configured to secure a second component to the first component when the threaded shaft is secured to the first component and wherein the specified force is selected to be below an amount causing damage to the second component.

8. A system comprising:
    a first component;
    a screw comprising a screw head and a threaded shaft;
    a second component secured by the screw to the first component; and
    a force release component comprising a screw plunger connected to the screw head that is coaxial with the threaded shaft and inserted into an opening in the threaded shaft and connecting the screw head to the threaded shaft to the screw, wherein the screw plunger is bonded to the threaded shaft with an adhesive, and wherein the plunger extends into the opening a distance less than a length of the threaded shaft, and wherein the screw plunger releases the screw head from the first component in response to a specified force on the screw head, the specified force is substantially along a screw axis,
    wherein a bond strength between the screw head and the threaded shaft is less than a bond strength between the threaded shaft and the first component.

9. The system of claim 8, wherein the second component and the first component comprise portions of an electronic component.

10. The system of claim 9, wherein the second component comprises a panel and the first component is disposed on a chassis of the electronic component and the screw secures the panel to the chassis.

11. The system of claim 10, wherein the panel covers a battery of the electronic component and expansion of the battery exerts a force on the panel and/or the chassis and wherein the specified force is below a damage point of the panel and/or the chassis due to the force the battery exerts on the panel and/or the chassis.

12. The system of claim 8, wherein the screw plunger is press fit into the threaded shaft.

13. The system of claim 8, wherein the specified force is higher than a force used to secure the screw to the first component.

14. The system of claim 8, wherein the first component is a boss.

15. A method comprising:
providing a first component;
providing a screw comprising a screw head and a threaded shaft;
providing a force release component comprising a screw plunger connected to the screw head that is coaxial with the threaded shaft and inserted into an opening in the threaded shaft, the screw plunger connecting the screw head to the threaded shaft to the screw, wherein the screw plunger is bonded to the threaded shaft with an adhesive, and wherein the plunger extends into the opening a distance less than a length of the threaded shaft, and wherein the screw plunger releases the screw head from the first component in response to a specified force on the screw head; and
securing a second component to the first component by securing the screw through an opening in the second component and the threaded shaft into the first component,
wherein a bond between the threaded shaft and the first component comprises a bonding strength such that, in response to the specified force, the screw head and screw plunger separates from the threaded shaft and breaks a bond between the screw plunger and the threaded shaft while the threaded shaft remains connected to the first component.

* * * * *